April 27, 1965
B. H. CLASON
3,180,309
INDICATOR SYSTEM
Filed Aug. 15, 1962
6 Sheets-Sheet 1
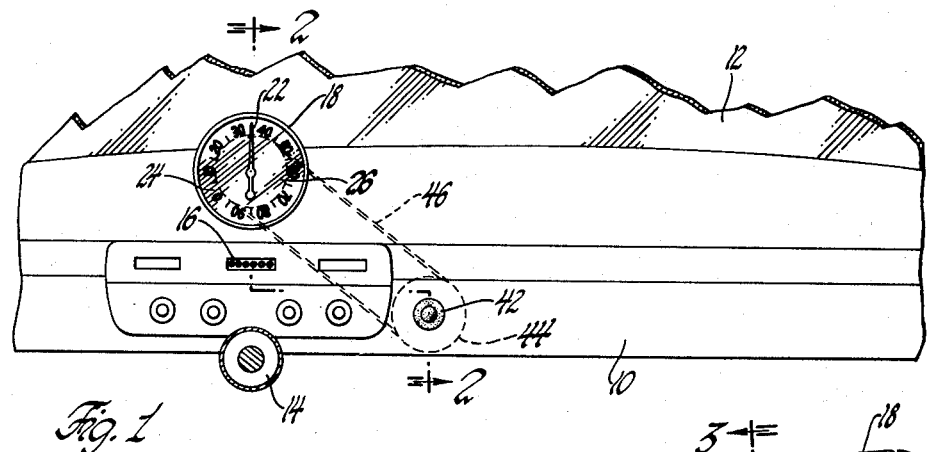
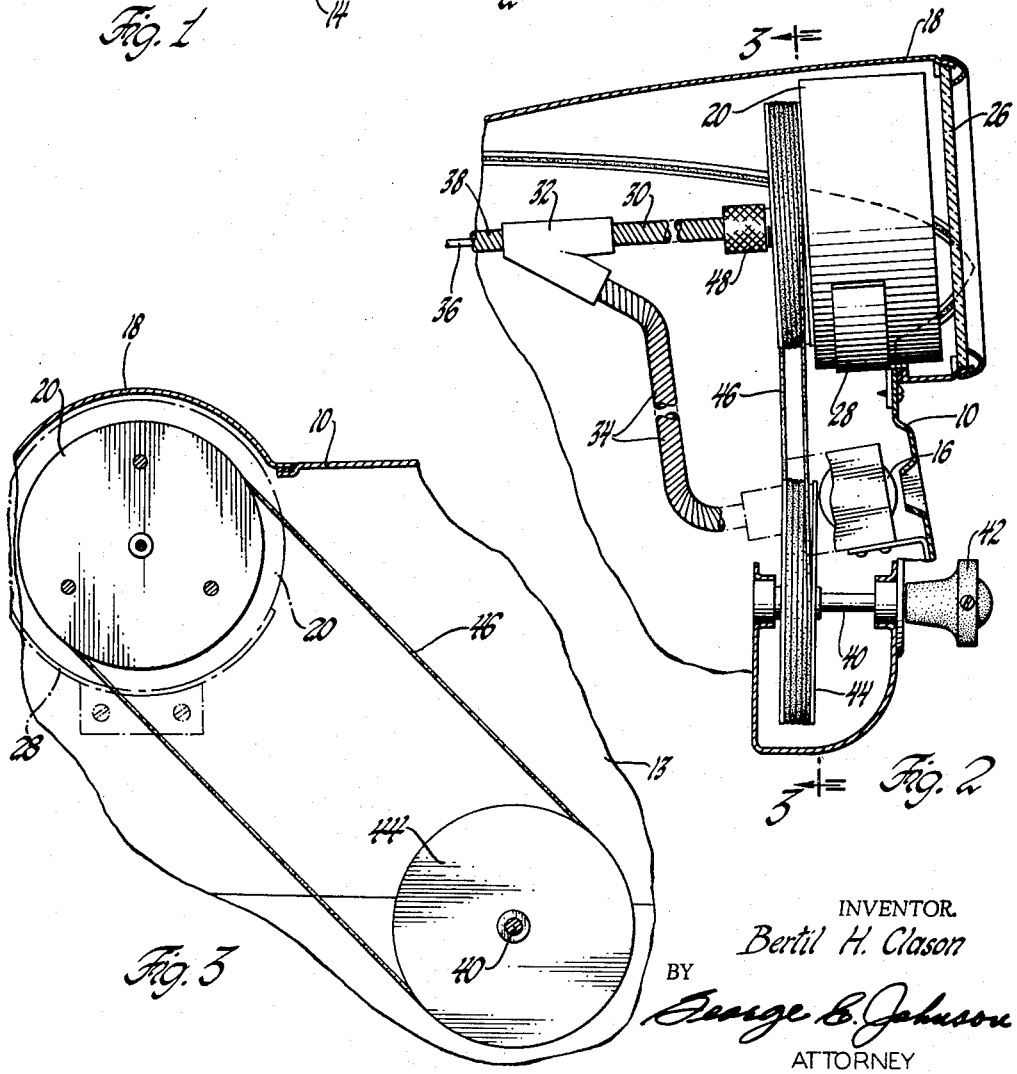
INVENTOR.
Bertil H. Clason
BY
George E. Johnson
ATTORNEY April 27, 1965

B. H. CLASON 3,180,309

INDICATOR SYSTEM

Filed Aug. 15, 1962

INVENTOR.
Bertil H. Clason
BY
George E. Johnson
ATTORNEY

April 27, 1965   B. H. CLASON   3,180,309
INDICATOR SYSTEM
Filed Aug. 15, 1962   6 Sheets-Sheet 3
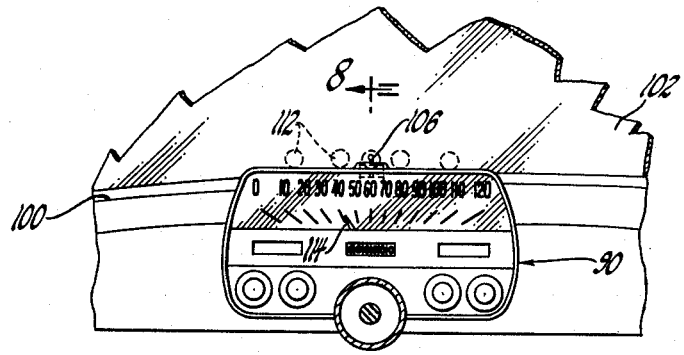
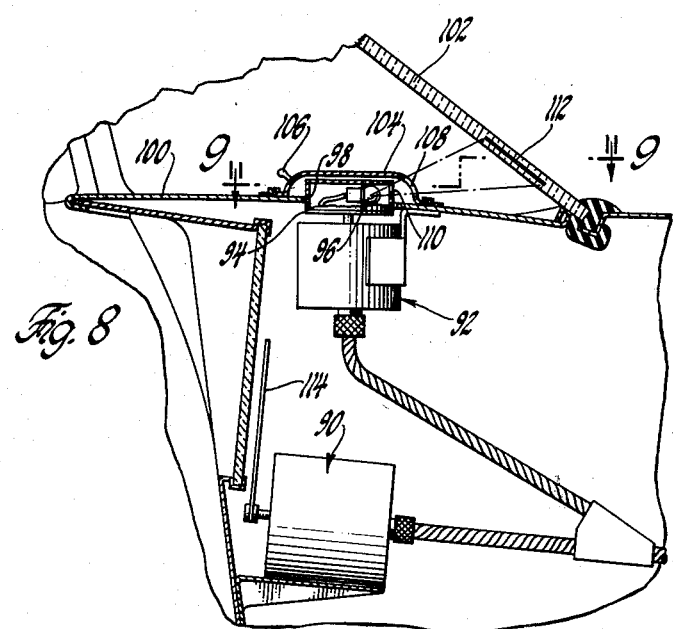
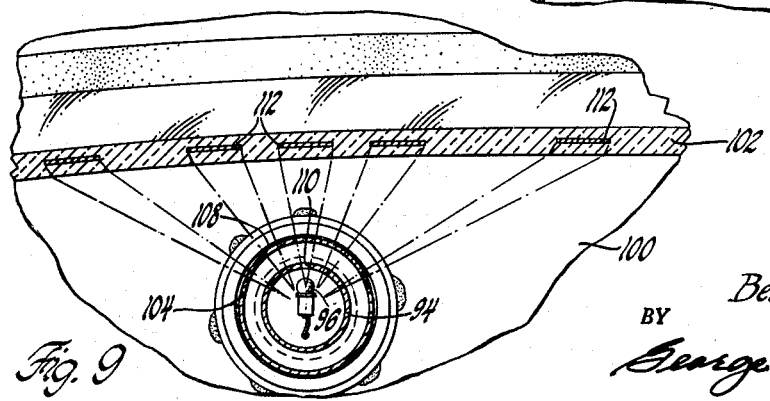
INVENTOR.
Bertil H. Clason
BY
George E. Johnson
ATTORNEY April 27, 1965     B. H. CLASON     3,180,309
INDICATOR SYSTEM
Filed Aug. 15, 1962     6 Sheets-Sheet 4

INVENTOR.
Bertil H. Clason
BY
George E. Johnson
ATTORNEY

April 27, 1965

B. H. CLASON 3,180,309

INDICATOR SYSTEM

Filed Aug. 15, 1962

INVENTOR.
Bertil H. Clason
BY
George E. Johnson
ATTORNEY

INVENTOR.
Bertil H. Clason
BY
George E. Johnson
ATTORNEY

United States Patent Office 3,180,309
Patented Apr. 27, 1965

3,180,309
INDICATOR SYSTEM
Bertil H. Clason, Flint, Mich., assignor to General Motors Corporation, Detroit, Mich., a corporation of Delaware
Filed Aug. 15, 1962, Ser. No. 217,079
2 Claims. (Cl. 116—116)

This invention relates to indicator systems and more particularly to indicator systems in which a pointer and dial are cooperatively related but not necessarily in registry to supply an indication of the extent of some value attained such as speed. The invention is herein illustrated as employed in speedometer systems for automobiles but it is obvious that the invention could be used in systems for indicating an extent of variable value or condition being measured other than speed such as pressure, elevation, flow of current in an electrical circuit, or a damper position, these being recited merely as examples.

Audible and automatic speed warning devices have become common as accessories in modern automobiles. Such a device, as heretofore developed, requires a driver unduly to divert his attention from the road and watch his speedometer or constantly listen to the audible warning if he desires to maintain his speed at a predetermined or desired miles per hours rate.

An object of the present invention is to provide an improved indicator system requiring a minimum diversion of an operator's attention in the maintaining of a pre-selected speed or other value or condition.

To this end, the present invention contemplates the use of indicator means adapted to serve with maximum convenience, while vertically disposed, as a visual indicator that the extent of a value or condition as selected has been attained, the indicator means constituting a slot for directing a beam of light upwardly for viewable reflection of a pointer and being in combination but necessarily in registration with a main graduated or dial instrument facing the same general direction as the indicator for observation from the same vantage point.

These and other important features of the invention will now be described in detail in the specification and then pointed out more particularly in the appended claims.

In the drawings:

FIGURE 1 is an elevation view showing portions of an automobile instrument panel and windshield and illustrating and illustrating one embodiment of the present invention;

FIGURE 2 is an enlarged sectional view looking in the direction of the arrows 2—2 in FIGURE 1;

FIGURE 3 is a sectional view looking in the direction of the arrows 3—3 in FIGURE 2;

FIGURE 7 is an elevation view similar to FIGURE 1 but showing a third embodiment of the present invention;

FIGURE 8 is an enlarged sectional view looking in the direction of the arrows 8—8 in FIGURE 7;

FIGURE 9 is a further enlarged sectional view looking in the direction of the arrows 9—9 in FIGURE 8;

Figure 4:
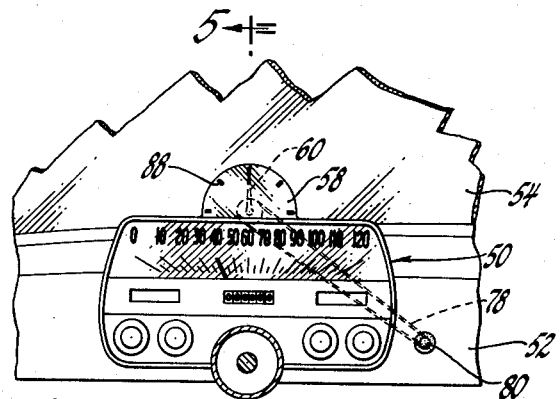
FIGURE 4 is an elevation view similar to FIGURE 1, but showing a second embodiment of the present invention.

FIGURE 1 shows an instrument panel 10 of an automobile with a portion of a windshield 12 extending upwardly therefrom. The panel is located rearward of a fire wall 13 (FIGURE 3) and is provided with a conventional steering column mounting 14 and an odometer arrangement 16. Above the odometer the panel is upwardly enlarged as at 18 to enclose a conventional dial and pointer type cylindrical speedometer 20. The pointer is indicated at 22 and graduations on the dial are indicated at 24. The dial and pointer are exposed to the view of the operator through a window 26. The speedometer 20, including its pointer 22, is rotatably mounted in a supporting strap 28 fixed to the panel 10 and the pointer 22 is adapted to be driven through a magnet and speed cup in a conventional manner by means of a flexible cable retained within a conduit 30. The flexible cable extends into a Y-connection 32 and is so geared to a second flexible cable enclosed in a conduit 34 that the odometer 16 and the speedometer 20 may be driven by a common drive cable 36 retained within a conduit 38 and driven from the vehicle transmission. Obviously, a common drive cable is not essential as the speedometer 20 and odometer 16 could be separately driven as separate indicators of the speed and distance traveled.

The panel 10 rotatably supports a shaft 40 and the exposed end of the shift is provided with a knob 42 accessible to the operator. Fixed to the shaft 40 is a pulley 44 and the latter is connected by means of a belt 46 to the casing of the speedometer 20. A coupling 48 is such as to permit rotation of the speedometer 20 with relation to the conduit 30.

It will be noted that the speedometer is located at a rather high elevation so that the driver of the vehicle need not unduly divert his attention from the road and yet see the graduations 24 of the speedometer.

Assuming that the driver wishes to retain his vehicle speed at thirty-five miles per hour, he will actuate the knob 42 to place the thirty-five miles per hour graduation at the top of the speedometer. Thereafter, the operator may quickly ascertain that the thirty-five-mile limit has been reached or is being maintained when the pointer is vertical. The vertical pointer position is an extremely dominant and convenient signal.

Figure 5:
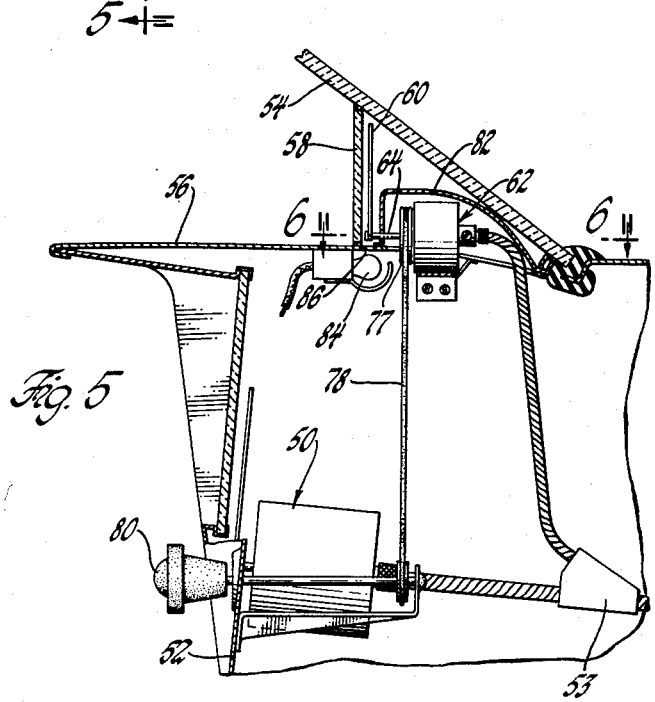
FIGURE 5 is an enlarged sectional view looking in the direction of the arrows 5—5 of FIGURE 4.
Figure 6:
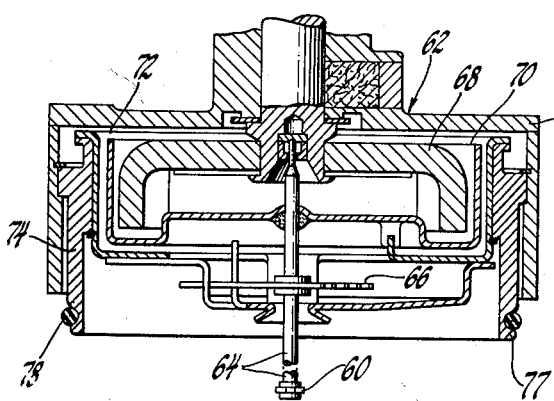
FIGURE 6 is a further enlarged sectional view of a speedometer drive mechanism looking in the direction of the arrows 6—6 in FIGURE 5.

In the modification of FIGURES 4, 5 and 6, the same principle is utilized—the use of a vertical signal—but in this instance a main speedometer 50 is located in fixed nonrotative position on the automobile instrument panel 52 and is adapted in a conventional manner to give miles per hour readings.

As in FIGURES 1 to 3, a Y-connection 53 is shown through which two instruments are driven—in this case, two speedometers. Between a windshield 54 and a top shelf 56 of the panel 52 is located a vertical transparent window 58 through which a pointer 60 of a second speedometer or indicator 62 is observable to the operator. This pointer is fixed to the end of a shaft 64 of the speedometer to rotate therewith.

A hairspring 66 of more sensitivity than that of a standard speedometer is used in order to gain a larger angular sweep of the pointer 60. The usual magnet 68 and speed cup 70 are employed as taught in the United States Patent No. 2,627,401, granted February 3, 1953, in the name of Henry H. Harada and entitled "Speed Cup Bias Spring." The field cup 72 and casing 74, however, are rotatable within a fixed supporting casing 76 by means of a pulley 77 and a belt 78. The latter may be actuated by a hand-knob 80 much like in the first modification of FIGS. 1 to 3. An inner top casing 82 encloses the speedometer 62 and the pulley connection. A lamp 84 is so mounted as to illuminate the pointer 60 through an opening 86 in the shelf 56. As is conventional, the magnet 68 is positively rotated by the drive cable. It serves, by magnetic action, to drag the cup 70 around and with it an extent dependent upon the calibrated resistance of the spring 66.

No calibration of the second speedometer 62 is needed other than that performed by the operator in actuating the knob 80. If the operator desires to go at thirty-five miles per hour, his regular speedometer 50 will tell when that speed is reached upon which he will turn the knob 80 until the pointer 60 is vertical. Reference marks 88 for straight up and down and at angles with the vertical aids the driver in maintaining a preselected speed or other than that conforming with but near that of the vertical position of the pointer 60.

In FIGURES 7, 8 and 9, a third modification is shown. In this instance, two speedometers 90 and 92 each with conventional speed cup and hairspring are used as in FIGURES 4, 5 and 6 with the main instrument 90 mounted in the dash, but the second speedometer 92 is mounted with its axis vertical thereby being capable of rotating a light shield 94 and a lamp 96 enclosed thereby around that axis.

The shield 94 extends upwardly through an opening 98 in the shelf 100 under a windshield 102 and an opaque cover 104 is rotatably mounted on the shelf thereby concealing the shield and opening. As indicated in FIGURE 8, the margin of the cover is retained under a circular flange. A handle 106 is made integral with the cover 104. A vertically extending opening 108 is formed in the cover to direct light beams at an upward angle from the lamp 96 and an opening 110 in the shield 94 when the openings 108 and 110 are in alignment with the lamp 96. Reflection discs 112 are placed in, on or near the windshield 102 and are so located that each may be illuminated by the light beams in accordance with the attainment of a preselected speed. For example, the selected speed may be forty miles per hour in accordance with the reading of the pointer 114 of the main speedometer 90. The cover 104 is rotated until light beams reflect from one of the discs 112 which is preselected as the forty mile per hour indicator. Rotation of cover 104 so that only that disc will be illuminated will cause that disc to be effective. Adjoining discs are so placed as to show other speeds which may be selected as desirable. The discs 112 are not intended to function as mirrors giving definite images but are of a material such as white or colored plastic, paper, paint or other material capable of reflecting light generally.

Figure 10:
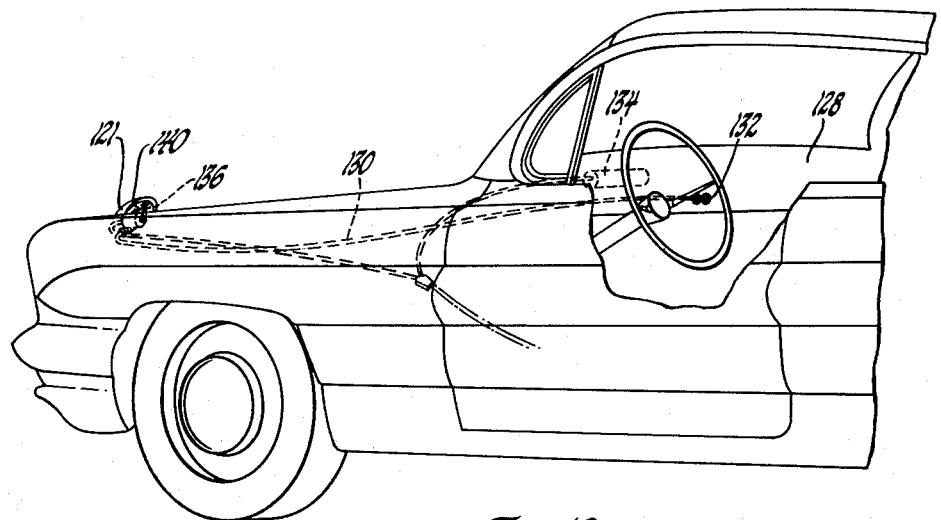
FIGURE 10 is a perspective view of the forward portion of an automobile on which a fourth embodiment of the present invention is installed.
Figure 11:
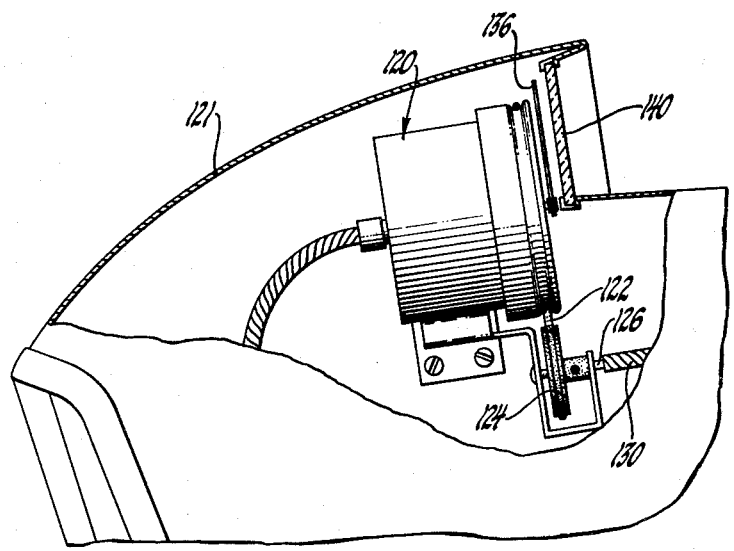
FIGURE 11 is an enlarged elevational view of a forward hood portion of the automobile shown in FIGURE 10 with a portion removed better to illustrate the construction.

In FIGURES 10 and 11, a second speedometer 120 is used in the nature of a hood ornament. The entire speedometer is concealed under metal work 121 and may be rotated by means of a belt 122 and a pulley 124 actuated by a Bowden wire 126 extending from the instrument panel 128 and enclosed within a conduit 130 and fitted with a knob 132. A regular or main speedometer 134 is placed on the dash 128 and the vertical position of the pointer 136 of the speedometer 120 is made to coincide with a preselected speed by observance of the main speedometer 134 and actuation of the knob 132. The pointer 136 is readily observable to the operator through the window 140. Rotating the knob 132 serves to rotate the entire speedometer 120 through the belt 122 to a position at which the preselected speed legend or numeral will be uppermost. When the point 136 sub- sequently becomes vertical during operation of the vehicle, the operator has his signal that the selected speed has been attained.

Figure 12:
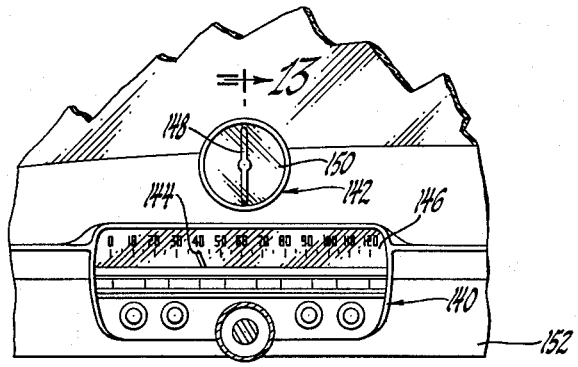
FIGURE 12 is an elevation view similar to FIGURE 1 but showing a fifth embodiment of the present invention.
Figure 13:
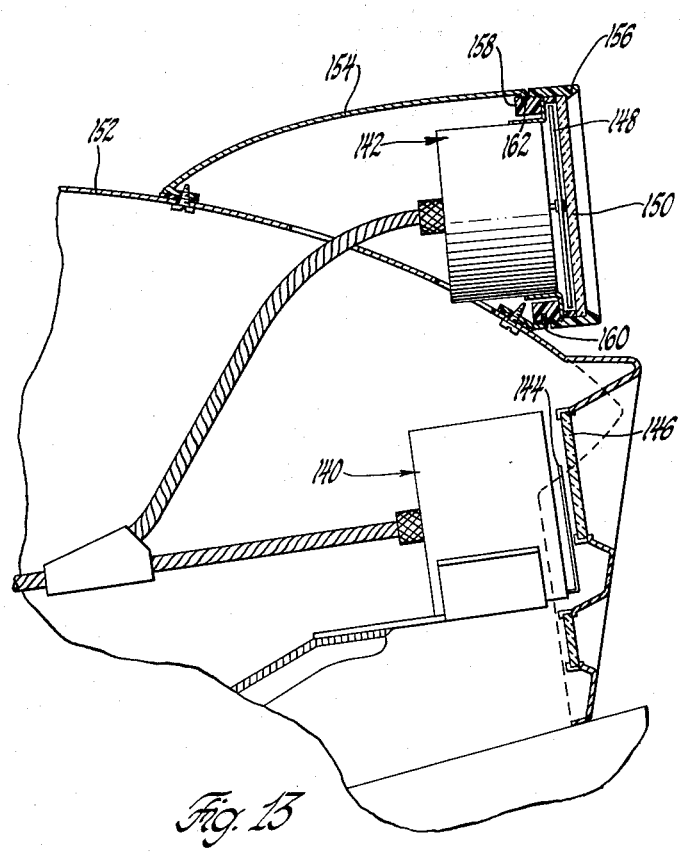
FIGURE 13 is an enlarged sectional view looking in the direction of the arrows 13—13 in FIGURE 12.

FIGURES 12 and 13 show a fifth modification in which two speedometers 140 and 142 are used one above the other. They are driven from a common drive although as stated before with the other modification, such a drive is not essential. The speedometer 140 is adapted to serve as a main speedometer with a pointer 144 visible through a window 146. The second speedometer 142 also has a pointer 148 and this pointer is visible through a clear window 150 and no graduations are placed either on the window or on the dial of the speedometer. The instrument panel or dash 152 is provided with a small rearwardly protruding casing 154 for enclosing the speedometer 142. Support for this speedometer 142 is had by attaching it to a bezel 156 which carries a window 150 as well as an annular retainer member 158. The latter is formed with a groove 160 receiving an annular flange or lip 162 formed on the casing 154.

In this case, if it be assumed that the preselected speed is forty miles per hour, such speed is determined by the reading of the speedometer 140 after which the bezel 156 is rotated with the speedometer 142 so that the pointer 148 will be vertical. Any departure from the forty mile per hour speed will be indicated by the pointer 148 swinging from its vertical position.

Figure 14:
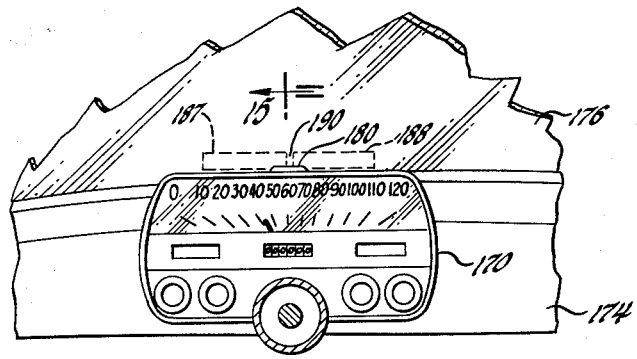
FIGURE 14 is an elevation view showing a modification of the arrangement depicted in FIGURE 7.
Figure 15:
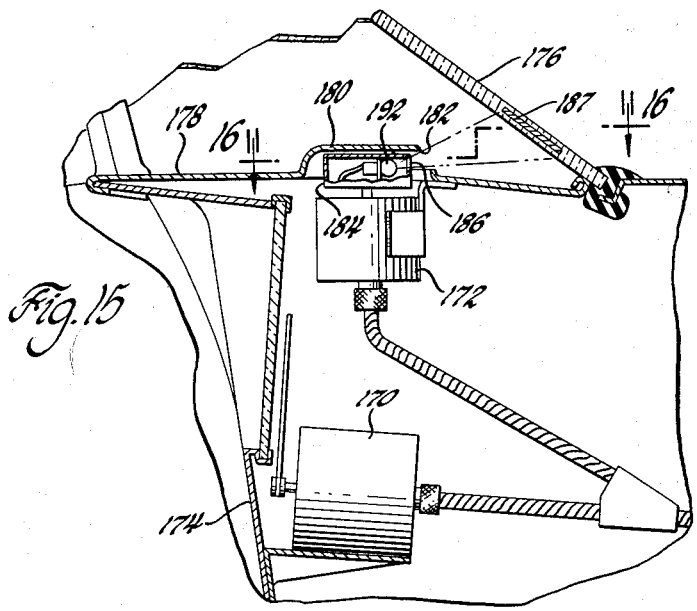
FIGURE 15 is a sectional view looking in the direction of the arrows 15—15 in FIGURE 14.
Figure 16:
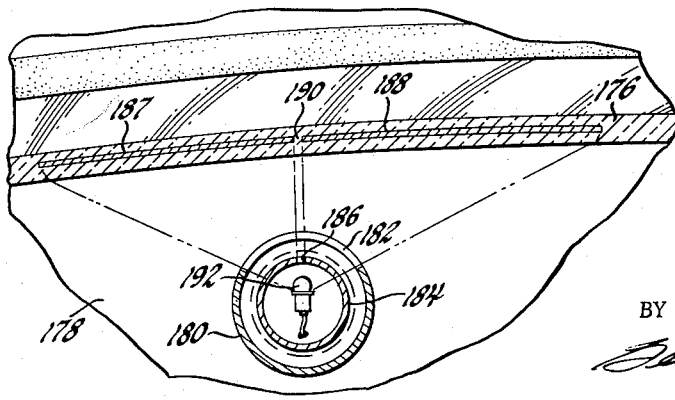
FIGURE 16 is a sectional view looking in the direction of the arrows 16—16 in FIGURE 15.

In FIGURES 14, 15 and 16, two speedometers 170 and 172 are related to an instrument panel 174 and a windshield 176 as in FIGURES 7, 8 and 9 but in this case the top 178 of the panel has an integral fixed cover 180 having a forwardly directed arcuate slot 182. The speedometer 172 is adapted to rotate a light shield 184 concealed by the cover. The shield bears an aperture 186 adapted to register with the slot 182. Reflection strips 187 and 188 are in, on or near the windshield 176 and separated by a narrow vertical space 190. The speedometer 172 may be rotated so that the aperture 186 will be positioned to direct light beams from a bulb 192 to the space 190 at a preselected speed. As in the use of the modification of FIGURES 7, 8 and 9, any departure from the preselected speed will be indicated by light reflecting from either of the strips 187 or 188. The strips 187 and 188 are of material similar to that suitable for the discs 112 of FIGURES 7, 8 and 9.

The vertical position of the indicator is a strong signal not only because of the location of the indicator close to or within the normal field of view of the operator but also by virtue of its vertical setting alone. In each of the six modifications described this vertical position is utilized to the best advantage.

I claim:

1. An indicator system comprising a support, a main graduated instrument such as a speedometer mounted on said support and adapted to indicate a reading of a value, an instrument mounted above said main instrument and having a pointer and a hairspring adapted to cooperate and indicate a reading pertaining to said value, and means for adjusting the rotative position of said pointer against the action of said hairspring whereby a vertical position of said pointer will conform with a preselected reading of said main instrument.

2. An indicator system comprising a support, a main graduated instrument such as a speedometer mounted on said support and adapted to indicate a reading of a value, a second instrument mounted on said support and having a pointer and a hairspring adapted to cooperate and indicate a reading pertinent to said value, said instruments being mounted to be viewed from a common vantage point, and means for adjusting the rotative position of said pointer against the action of said hairspring whereby a vertical position of said pointer will conform with a preselected reading of said main instrument.

(References on following page)

References Cited by the Examiner

UNITED STATES PATENTS

| | | | |
|---|---|---|---|
| 765,841 | 7/04 | Jones | 116—116 |
| 1,209,427 | 12/16 | Goldsworth | 116—57 |
| 1,442,937 | 1/23 | Gore | 116—57 |
| 1,679,203 | 7/28 | Blackburn | 73—498 |
| 2,191,045 | 2/40 | Slayton | 116—116 |
| 2,313,682 | 3/43 | Stuart | 33—222 |
| 2,464,190 | 3/49 | Leon-Tong Wen | 116—129 |
| 2,538,218 | 1/51 | Treese | 116—57 |
| 2,549,754 | 4/51 | Bosch | 73—498 |
| 2,641,159 | 6/53 | Mihalakis | 116—57 |
| 2,686,455 | 8/54 | Porsche | 116—57 |
| 2,804,931 | 9/51 | Najjar | 116—57 |
| 3,045,637 | 7/62 | La Fata | 116—57 |

FOREIGN PATENTS

| | | |
|---|---|---|
| 1,035,163 | 4/53 | France. |
| 808,645 | 7/51 | Germany. |

LOUIS J. CAPOZI, *Primary Examiner.*